(12) United States Patent
Liu

(10) Patent No.: US 11,159,294 B2
(45) Date of Patent: Oct. 26, 2021

(54) METHOD FOR OBTAINING TIME-FREQUENCY RESOURCE POSITION OF COMMON CONTROL RESOURCE SET OF REMAINING SYSTEM INFORMATION

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/636,336

(22) PCT Filed: Aug. 4, 2017

(86) PCT No.: PCT/CN2017/096018
§ 371 (c)(1),
(2) Date: Feb. 4, 2020

(87) PCT Pub. No.: WO2019/024087
PCT Pub. Date: Feb. 7, 2019

(65) Prior Publication Data
US 2020/0162222 A1    May 21, 2020

(51) Int. Cl.
*H04L 5/00* (2006.01)
*H04L 27/26* (2006.01)
(Continued)

(52) U.S. Cl.
CPC .......... *H04L 5/0053* (2013.01); *H04L 5/0048* (2013.01); *H04L 27/2657* (2013.01);
(Continued)

(58) Field of Classification Search
CPC ............... H04L 5/0053; H04L 5/0048; H04L 27/2657; H04W 48/16; H04W 72/042; H04W 72/0446; H04W 72/0453
See application file for complete search history.

(56) References Cited

U.S. PATENT DOCUMENTS

2010/0124919 A1   5/2010   Ko et al.
2019/0306847 A1*  10/2019  Seo ........................ H04W 72/04
(Continued)

FOREIGN PATENT DOCUMENTS

CN      101395830 A     3/2009
CN      101300802 A     11/2018

OTHER PUBLICATIONS

Intel Corporation, "Details on NR PBCH design" 3GPP TSG RAN WG1 Meeting RAN1 #89 R1-1707339 Hangzhou, P.R. China May 15-19, 2017.

*Primary Examiner* — Ronald B Abelson
(74) *Attorney, Agent, or Firm* — Syncoda LLC; Feng Ma

(57) ABSTRACT

A method for acquiring a time-frequency resource location of a CORESET of RMSI includes: receiving a synchronization signal sent by a base station, and determining a synchronization signal block corresponding to the synchronization signal; acquiring a physical broadcast channel PBCH of the synchronization signal block, where the PBCH carries time-domain information and frequency-domain information corresponding to the CORESET of the RMSI; and acquiring, according to the time-domain information and the frequency-domain information corresponding to the CORESET of the RMSI, the time-frequency resource location of the CORESET of a corresponding RMSI. As such, a UE may acquire the time-frequency resource location of the CORESET of the corresponding RMSI, which has a simple implementation manner.

16 Claims, 7 Drawing Sheets

(51) Int. Cl.
*H04W 48/16* (2009.01)
*H04W 72/04* (2009.01)

(52) U.S. Cl.
CPC ......... *H04W 48/16* (2013.01); *H04W 72/042* (2013.01); *H04W 72/0446* (2013.01); *H04W 72/0453* (2013.01)

(56) References Cited

U.S. PATENT DOCUMENTS

2020/0127879 A1* 4/2020 Yokomakura ........... H04L 27/26
2020/0154377 A1* 5/2020 Qian ..................... H04W 56/00

* cited by examiner

METHOD FOR OBTAINING TIME-FREQUENCY RESOURCE POSITION OF COMMON CONTROL RESOURCE SET OF REMAINING SYSTEM INFORMATION

CROSS-REFERENCE TO RELATED APPLICATION

This application is a national stage of International Application No. PCT/CN2017/096018 filed on Aug. 4, 2017, the disclosure of which is hereby incorporated by reference in its entirety.

TECHNICAL FIELD

The present disclosure relates to the field of communication technology, and in particular to a method and device for acquiring a time-frequency resource location of a common control resource set (CORESET) of remaining system information (RMSI), a method and device for indicating a time-frequency resource location of a CORESET of RMSI, a user equipment, a base station, and a computer-readable storage medium.

BACKGROUND

With rapid development of wireless communication technology, a fifth-generation mobile communication technology (5th Generation, referred to as 5G for short) has appeared. In a 5G system, a downlink synchronization method based on a beam scanning synchronization signal block (SSB) is introduced, that is, the introduced synchronization signal block includes a primary synchronization signal (PSS), a secondary synchronization signal (SSS), and a physical broadcast channel (PBCH). A user equipment (UE) may obtain some key system information by analyzing the PBCH, but the PBCH can carry very few bits, so it is impossible to carry all the key system information. Therefore, the Third Generation Partnership Project (3GPP) divides the key system information into two parts, and the part not carried by the PBCH is called as remaining system information (RMSI). Although the PBCH cannot carry contents of the RMSI, it must allocate a location for the RMSI. At the 3GPP meeting, companies agreed that the RMSI is carried on a physical downlink shared channel (PDSCH), and the 3GPP also defined a time-frequency resource set where the physical downlink control channel (PDCCH) is located as a common control resource set (CORESET). Therefore, the time-frequency resource location of the above-mentioned CORESET needs to be allocated in the PBCH.

SUMMARY

In view of the above, the present application discloses a method and device for acquiring a time-frequency resource location of a CORESET of RMSI, a method and device for indicating a time-frequency resource location of a CORESET of RMSI, a user equipment, a base station, and a computer-readable storage medium, so as to carry time-frequency information of a CORESET of RMSI in a PBCH and determine a time-frequency resource location of the CORESET of the RMSI according to the time-frequency information of the CORESET of the RMSI carried in the PBCH.

According to a first aspect of embodiments of the present disclosure, there is provided a method for acquiring a time-frequency resource location of a common control resource set CORESET of remaining system information RMSI, which is applied to a user equipment, including: receiving a synchronization signal sent by a base station, and determining a synchronization signal block corresponding to the synchronization signal; acquiring a physical broadcast channel PBCH of the synchronization signal block, where the PBCH carries time-domain information and frequency-domain information corresponding to the CORESET of the RMSI; and acquiring, according to the time-domain information and the frequency-domain information corresponding to the CORESET of the RMSI, the time-frequency resource location of the CORESET of a corresponding RMSI.

In an embodiment, the time-domain information includes window information and a time-domain symbol value, and the acquiring, according to the time-domain information and the frequency-domain information corresponding to the CORESET of the RMSI, the time-frequency resource location of the CORESET of a corresponding RMSI includes: determining a window corresponding to the CORESET of the RMSI, according to the window information corresponding to the CORESET of the RMSI; and performing a blind detection in the window according to the time-domain symbol value and the frequency-domain information corresponding to the CORESET of the RMSI, to acquire the time-frequency resource location of the CORESET of the corresponding RMSI.

In an embodiment, the window information corresponding to the CORESET of the RMSI includes a time difference between the RMSI and a corresponding synchronization signal block and a window length, and the frequency-domain information corresponding to the CORESET of the RMSI includes a number of physical resource blocks PRBs of the corresponding synchronization signal block of the RMSI.

In an embodiment, the determining a window corresponding to the CORESET of the RMSI, according to the window information corresponding to the CORESET of the RMSI includes: determining a start time of the window according to the time difference between the RMSI and the corresponding synchronization signal block and a sending time of the corresponding synchronization signal block; determining a time interval between the corresponding synchronization signal block of the RMSI and a next synchronization signal block and a minimum value of the window length as a final window length of the window; and determining the window corresponding to the CORESET of the RMSI, according to the start time of the window and the final window length of the window.

According to a second aspect of embodiments of the present disclosure, there is provided a method for indicating a time-frequency resource location of a common control resource set CORESET of remaining system information RMSI, which is applied to a base station, including: configuring time-domain information and frequency-domain information for the CORESET of the RMSI; and sending a synchronization signal to a user equipment UE, where a physical broadcast channel PBCH of a synchronization signal block corresponding to the synchronization signal carries the time-domain information and the frequency-domain information corresponding to the CORESET of the RMSI, for the UE to acquire, according to the time-domain information and the frequency-domain information corresponding to the CORESET of the RMSI, the time-frequency resource location of the CORESET of a corresponding RMSI.

In an embodiment, the time-domain information corresponding to the CORESET of the RMSI includes window information and a time-domain symbol value.

In an embodiment, the window information includes a time difference between the RMSI and a corresponding synchronization signal block and a window length, and the frequency-domain information corresponding to the CORESET of the RMSI includes a number of PRBs of the corresponding synchronization signal block of the RMSI.

According to a third aspect of embodiments of the present disclosure, there is provided a device for acquiring a time-frequency resource location of a common control resource set CORESET of remaining system information RMSI, which is applied to a user equipment, including: a receiving and determining module, configured to receive a synchronization signal sent by a base station, and determine a synchronization signal block corresponding to the synchronization signal; a first acquiring module, configured to acquire a physical broadcast channel PBCH of the synchronization signal block determined by the receiving and determining module, where the PBCH carries time-domain information and frequency-domain information corresponding to the CORESET of the RMSI; and a second acquiring module, configured to acquire, according to the time-domain information and the frequency-domain information corresponding to the CORESET of the RMSI carried by the PBCH and acquired by the first acquiring module, the time-frequency resource location of the CORESET of a corresponding RMSI.

In an embodiment, the time-domain information includes window information and a time-domain symbol value, and the second acquiring module includes: a window determining sub-module, configured to determine a window corresponding to the CORESET of the RMSI, according to the window information corresponding to the CORESET of the RMSI; and a blind detection sub-module, configured to perform a blind detection in the window determined by the window determining sub-module according to the time-domain symbol value and the frequency-domain information corresponding to the CORESET of the RMSI, to acquire the time-frequency resource location of the CORESET of the corresponding RMSI.

In an embodiment, the window information corresponding to the CORESET of the RMSI includes a time difference between the RMSI and a corresponding synchronization signal block and a window length, and the frequency-domain information corresponding to the CORESET of the RMSI includes a number of physical resource blocks PRBs of the corresponding synchronization signal block of the RMSI.

In an embodiment, the window determining sub-module includes: a first determining unit, configured to determine a start time of the window according to the time difference between the RMSI and the corresponding synchronization signal block and a sending time of the corresponding synchronization signal block; a second determining unit, configured to determine a time interval between the corresponding synchronization signal block of the RMSI and a next synchronization signal block and a minimum value of the window length as a final window length of the window; and a third determining unit, configured to determine the window corresponding to the CORESET of the RMSI, according to the start time of the window determined by the first determining unit and the final window length of the window determined by the second determining unit.

According to a fourth aspect of the present disclosure, there is provided a device for indicating a time-frequency resource location of a common control resource set CORESET of remaining system information RMSI, which is applied to a base station, including: a configuring module, configured to configure time-domain information and frequency-domain information for the CORESET of the RMSI; and a sending module, configured to send a synchronization signal to a user equipment UE, where a physical broadcast channel PBCH of a synchronization signal block corresponding to the synchronization signal carries the time-domain information and the frequency-domain information corresponding to the CORESET of the RMSI configured by the configuring module, for the UE to acquire, according to the time-domain information and the frequency-domain information corresponding to the CORESET of the RMSI, the time-frequency resource location of the CORESET of a corresponding RMSI.

In an embodiment, the time-domain information corresponding to the CORESET of the RMSI includes window information and a time-domain symbol value.

In an embodiment, the window information includes a time difference between the RMSI and a corresponding synchronization signal block and a window length, and the frequency-domain information corresponding to the CORESET of the RMSI includes a number of PRBs of the corresponding synchronization signal block of the RMSI.

According to a fifth aspect of the present disclosure, there is provided a user equipment, including: a processor, and a memory, for storing instructions executable by the processor. The processor is configured to: receive a synchronization signal sent by a base station, and determine a synchronization signal block corresponding to the synchronization signal; acquire a physical broadcast channel PBCH of the synchronization signal block, where the PBCH carries time-domain information and frequency-domain information corresponding to a CORESET of RMSI; and acquire, according to the time-domain information and the frequency-domain information corresponding to the CORESET of the RMSI, a time-frequency resource location of the CORESET of a corresponding RMSI.

According to a sixth aspect of the present disclosure, there is provided a base station, including: a processor, and a memory, for storing instructions executable by the processor. The processor is configured to: configure time-domain information and frequency-domain information for a CORESET of RMSI; and send a synchronization signal to a user equipment UE, where a physical broadcast channel PBCH of a synchronization signal block corresponding to the synchronization signal carries the time-domain information and the frequency-domain information corresponding to a CORESET of RMSI, for the UE to acquire, according to the time-domain information and the frequency-domain information corresponding to the CORESET of the RMSI, a time-frequency resource location of the CORESET of a corresponding RMSI.

According to a seventh aspect of the present disclosure, there is provided a computer-readable storage medium, with computer programs stored thereon. When the computer programs are executed by a processor, steps of the method for acquiring the time-frequency resource location of the CORESET of the RMSI described above are implemented.

According to an eighth aspect of the present disclosure, there is provided a computer-readable storage medium, with computer programs stored thereon. When the computer programs are executed by a processor, steps of the method for indicating the time-frequency resource location of the CORESET of the RMSI described above are implemented.

The technical solutions provided by embodiments of the present disclosure may include the following beneficial effects.

A synchronization signal block corresponding to a received synchronization signal is determined, a PBCH of the synchronization signal block is acquired, and then a time-frequency resource location of a CORESET of a corresponding RMSI is acquired according to time-domain information and frequency-domain information corresponding to the CORESET of the RMSI carried by the PBCH, which brings a simple implementation manner.

A window corresponding to the CORESET of the RMSI is determined, and a few blind detections are performed in the window to acquire the time-frequency resource location of the CORESET of the corresponding RMSI, which brings a simple implementation manner and has a small resource-consumption.

Contents of window information and frequency-domain information are illustrated specifically, which makes a technical solution to be implemented more easily.

The window is determined by determining a start time of the window according to a time difference between the RMSI and the corresponding synchronization signal block and a sending time of the corresponding synchronization signal block, and determining a time interval between the corresponding synchronization signal block of the RMSI and a next synchronization signal block and a minimum value of the window length as a final window length of the window, which provides a condition for performing a blind detection in the window afterwards.

Time-domain information and frequency-domain information are configured for a CORESET of RMSI, and a PBCH of a synchronization signal block corresponding to a synchronization signal sent to a UE carries time-domain information and frequency-domain information corresponding to the CORESET of the RMSI, which provides a condition for the UE to acquire a time-frequency resource location of the CORESET of a corresponding RMSI.

Content of the time-domain information is illustrated specifically, which makes a technical solution to be implemented more easily.

Contents of the window information and the frequency-domain information are illustrated specifically, which makes a technical solution to be implemented more easily.

It should be understood that the above general description and the following detailed description are merely exemplary and explanatory, and should not limit the present disclosure.

BRIEF DESCRIPTION OF THE DRAWINGS

The drawings herein are incorporated into and constitute a part of this specification, illustrate embodiments consistent with the present disclosure, and together with the description serve to explain principle of the present disclosure.

DETAILED DESCRIPTION

Figure 1:
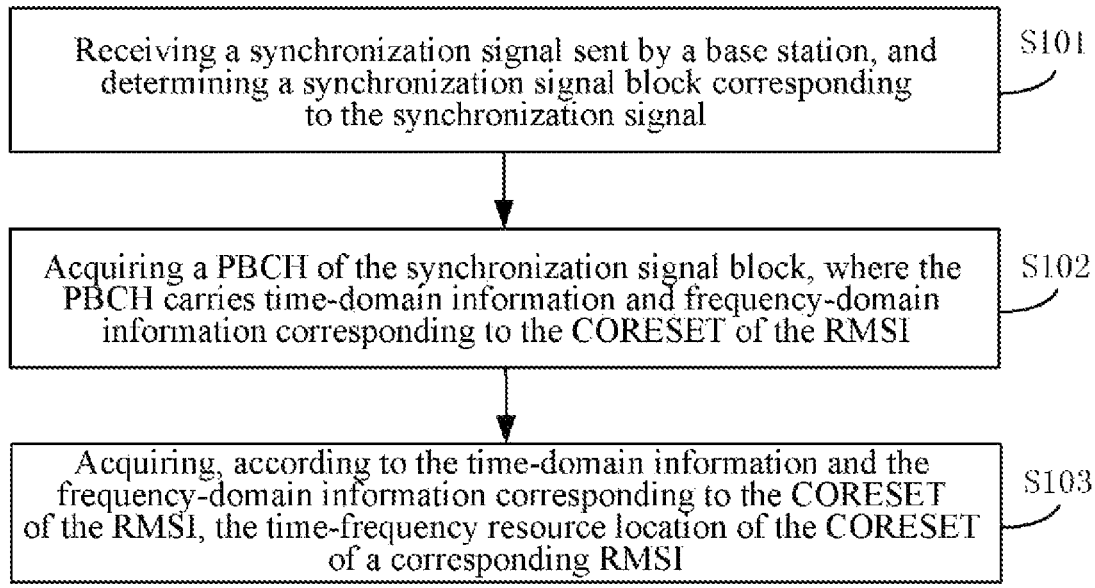
FIG. 1 is a flowchart of a method for acquiring a time-frequency resource location of a CORESET of RMSI according to an exemplary embodiment of the present application.

Exemplary embodiments will be described in detail herein, examples of which are illustrated in the accompanying drawings. When the following description refers to the accompanying drawings, same reference numerals in different drawings represent same or similar elements unless otherwise indicated. Implementations described in the following exemplary embodiments do not represent all implementations consistent with the present disclosure. Rather, they are merely examples of devices and methods consistent with some aspects of the present disclosure as detailed in the appended claims.

At present, before a UE acquires RMSI, it only has information of a SSB. That is, the UE knows the synchronization signal block resolved by itself, but a base station does not know which synchronization signal block the UE resolved. Therefore, the base station sends time-frequency information of a CORESET of the RMSI in a beam scanning manner, and there is a correspondence between each scanning beam and an index of the synchronization signal block. However, because there is a minimum bandwidth limitation that the UE can support, for frequency-domain, except for SSB bandwidth, the remaining bandwidth is limited. Therefore, it is not feasible to use frequency division multiplexing for the SSB and the RMSI. However, a time division multiplexing is possible, that is, the RMSI is transmitted at another time after the SSB is transmitted. Since transmission time of the SSB does not exceed 5 ms in each 20 ms period, even in the case of taking into account uplink transmission ratio during the period, the remaining 50% of time-domain resource can be used for scheduling the RMSI, that is, for carrying the time-frequency information of the CORESET of the RMSI.

FIG. 1 is a flowchart of a method for acquiring a time-frequency resource location of a CORESET of RMSI according to an exemplary embodiment of the present application. This embodiment will be described from a UE side. As shown in FIG. 1, the method for acquiring the time-frequency resource location of the CORESET of the RMSI includes the following steps.

In Step 101, a synchronization signal sent by a base station is received, and a synchronization signal block corresponding to the synchronization signal is determined.

Since the synchronization signal block includes the synchronization signal, after receiving the synchronization signal sent by the base station, the UE may determine a corresponding synchronization signal block according to the synchronization signal.

In Step 102, a PBCH of the synchronization signal block is acquired. The PBCH carries time-domain information and frequency-domain information corresponding to the CORESET of the RMSI.

Since the synchronization signal block also includes the PBCH, after determining the synchronization signal block, the UE may acquire the PBCH of the synchronization signal block.

In this embodiment, the time-domain information corresponding to the CORESET of the RMSI may include window information and a time-domain symbol value. There may be multiple time-domain symbol values, however each PBCH can only carry one time-domain symbol value, such as 1, 2, or 3, and so on. In this embodiment, the technical solution is easier to be implemented by specifically illustrating the content of the time-domain information.

In Step 103, the time-frequency resource location of the CORESET of a corresponding RMSI is acquired according to the time-domain information and the frequency-domain information corresponding to the CORESET of the RMSI.

In the above embodiment, the synchronization signal block corresponding to the received synchronization signal is determined, the PBCH of the synchronization signal block is acquired, and then the time-frequency resource location of the CORESET of the corresponding RMSI is acquired according to time-domain information and frequency-domain information corresponding to the CORESET of the RMSI carried by the PBCH, which brings a simple implementation manner.

Figure 2:
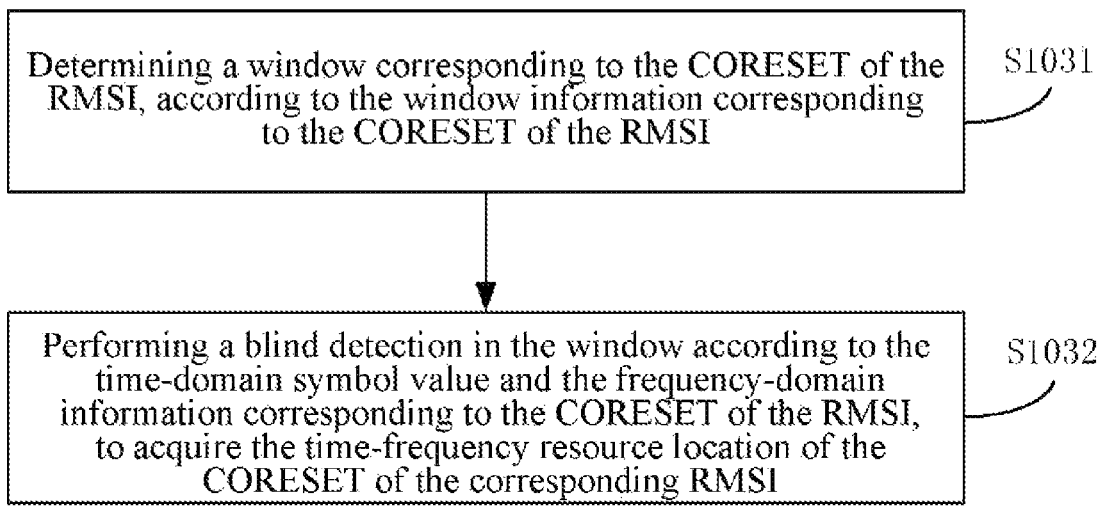
FIG. 2 is a flowchart of a method for acquiring a time-frequency resource location of a CORESET of RMSI according to an exemplary embodiment of the present application.

As shown in FIG. 2, the Step S103 may include the following steps.

In step S1031, a window corresponding to the CORESET of the RMSI is determined according to the window information corresponding to the CORESET of the RMSI.

In this embodiment, the window information corresponding to the CORESET of the RMSI may include a time difference between the RMSI and a corresponding synchronization signal block and a window length. A start time of the window may be determined according to the time difference between the RMSI and the corresponding synchronization signal block, and a final window length may be determined by the UE according to the window length. When a determined final window length is greater than 1, it indicates that the base station may send the time-frequency information of the CORESET through multiple times in the window, which has greater time flexibility and can stagger uplink scheduling. In this embodiment, the content of the window information is illustrated specifically, which makes the technical solution to be implemented more easily.

In Step 1032, a blind detection is performed in the window according to the time-domain symbol value and the frequency-domain information corresponding to the CORESET of the RMSI, to acquire the time-frequency resource location of the CORESET of the corresponding RMSI.

The frequency-domain information corresponding to the CORESET of the RMSI includes a number of physical resource blocks (PRBs) of the corresponding synchronization signal block of the RMSI. In this embodiment, the content of the frequency-domain information is illustrated specifically, which makes the technical solution to be implemented more easily.

In this embodiment, after determining the window corresponding to the CORESET of the RMSI, the UE may perform a small number of blind detections in the window to acquire the time-frequency resource location of the CORESET of the corresponding RMSI, which brings a simple implementation manner and has a small resource-consumption.

Figure 3:
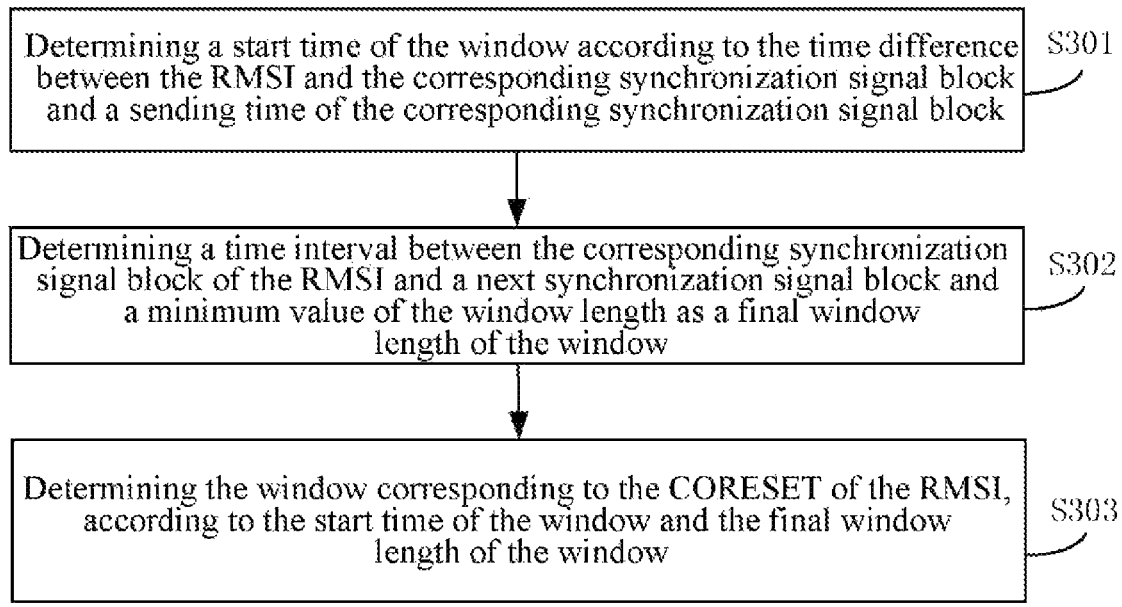
FIG. 3 is a flowchart for determining a window corresponding to a CORESET of RMSI according to an exemplary embodiment of the present application.

FIG. 3 is a flowchart for determining a window corresponding to a CORESET of RMSI according to an exemplary embodiment of the present application. As shown in FIG. 3, the determining the window corresponding to the CORESET of the RMSI includes the following steps.

In step S301, a start time of the window is determined according to the time difference between the RMSI and the corresponding synchronization signal block and a sending time of the corresponding synchronization signal block.

Assuming that the corresponding synchronization signal block of RMSI1 is synchronization signal block 1, and the time difference between the RMSI 1 and the synchronization signal block 1 is X, and the transmission time of the synchronization signal block 1 is T, the start time of the window is T+X.

In Step S302, a time interval between the corresponding synchronization signal block of the RMSI and a next synchronization signal block and a minimum value of the window length is determined as a final window length of the window.

Figure 4:
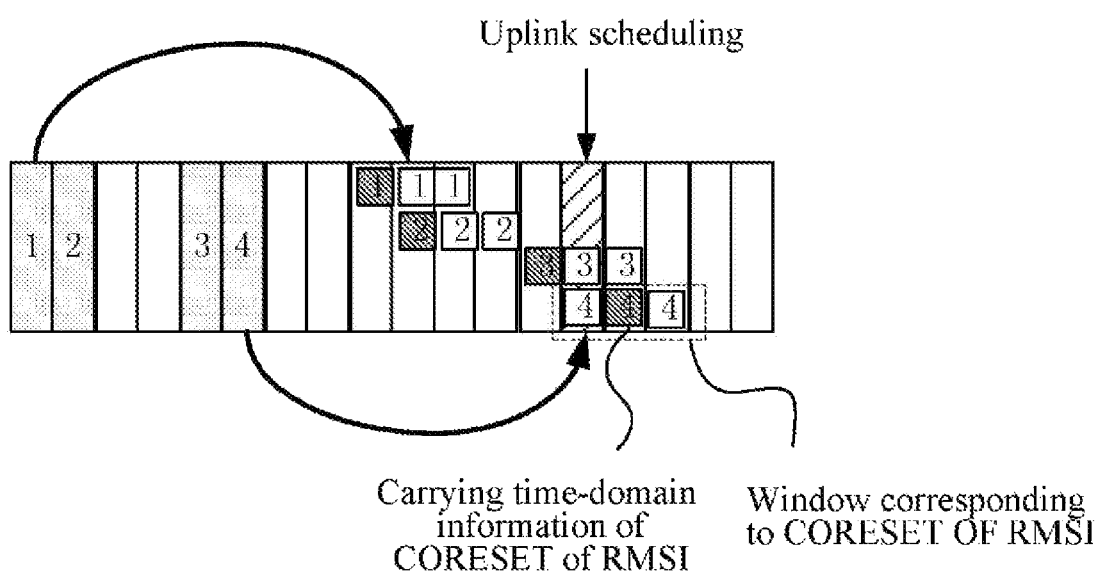
FIG. 4 is a schematic diagram of a downlink signal sent in beams by a base station according to an exemplary embodiment of the present application.

In order to more clearly describe the method of determining the final window length, the following description is given in conjunction with a downlink signal shown in FIG. 4. As shown in FIG. 4, there is a time interval between beams 1-2 and 3-4, and there are three time-domain resource units between beams 1 and 3. The time-domain resource unit can be a symbol, or a mini-slot, a time slot, a field, or a radio frame. Since the beam corresponds to the signal synchronization block, three resource units spaced between the beams 1 and 3 indicates that there are three resource unites between the signal synchronization block 1 and the signal synchronization block 3. Assuming that the window length configured by the base station is 5, the minimum value of 3 and 5 is taken, that is, 3, so the final window length determined is 3. The value in each window (that is, 1, 2, 3, or 4) represents the time domain symbol value of the corresponding window.

In step S303, the window corresponding to the CORESET of the RMSI is determined, according to the start time of the window and the final window length of the window.

After the UE determines the start time and the final window length of the window, the window is determined.

In this embodiment, the window is determined by determining the start time of the window according to a time difference between the RMSI and the corresponding synchronization signal block and the sending time of the corresponding synchronization signal block, and determining the time interval between the corresponding synchronization signal block of the RMSI and the next synchronization signal block and the minimum value of the window length as the final window length of the window, which provides a condition for performing the blind detection in the window afterwards.

Figure 5:
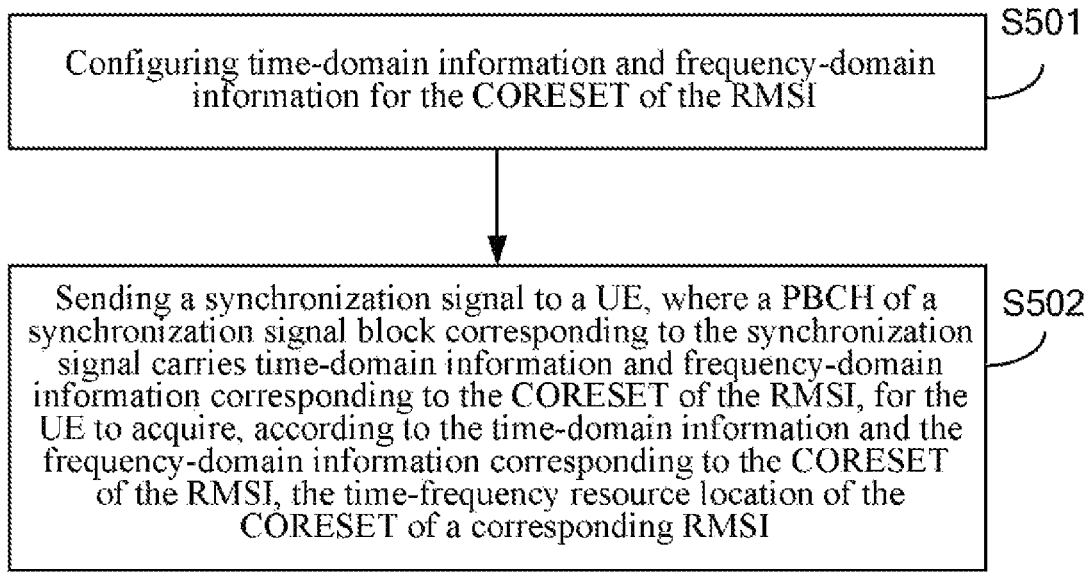
FIG. 5 is a flowchart of a method for indicating a time-frequency resource location of a CORESET of RMSI according to an exemplary embodiment of the present application.

FIG. 5 is a flowchart of a method for indicating a time-frequency resource location of a CORESET of RMSI according to an exemplary embodiment of the present application. This embodiment will be described from a base station side. As shown in FIG. 5, the method for indicating the time-frequency resource location of the CORESET of the RMSI includes the following steps.

In Step S501, time-domain information and frequency-domain information are configured for the CORESET of the RMSI.

In this embodiment, the time-domain information corresponding to the CORESET of the RMSI may include window information and a time-domain symbol value. There may be multiple time-domain symbol values, however each PBCH can only carry one time-domain symbol value, such as 1, 2, or 3, and so on. In this embodiment, the technical solution is easier to be implemented by specifically illustrating the content of the time-domain information. In this embodiment, the window information corresponding to the CORESET of the RMSI may include a time difference between the RMSI and a corresponding synchronization signal block and a window length. The frequency-domain information corresponding to the CORESET of the RMSI may include a number of PRBs of the corresponding synchronization signal block of the RMSI. In order to make a final window length determined by the UE greater than 1, the window length configured by the base station is also greater than 1, so as to achieve the purpose of sending the time-frequency information of the CORESET through multiple times in the window, and the time flexibility is stronger. This embodiment makes the technical solution easier to be implemented by specifically explaining the content of the window information and the content of the frequency-domain information.

In Step S502, a synchronization signal is sent to a UE. A PBCH of a synchronization signal block corresponding to the above synchronization signal carries the time-domain information and the frequency-domain information corresponding to the CORESET of the RMSI, for the UE to acquire, according to the time-domain information and the frequency-domain information corresponding to the CORESET of the RMSI, the time-frequency resource location of the CORESET of a corresponding RMSI.

The base station may send the synchronization signal through consecutive beams, and carry the time-domain information and the frequency-domain information configured for the CORESET of the RMSI in the PBCH of the synchronization signal block corresponding to the synchronization signal. In this way, after receiving the time-domain information and the frequency-domain information corresponding to the CORESET OF THE RMSI, the UE may acquire, according to the time-domain information and the frequency-domain information corresponding to the CORESET of the RMSI, the time-frequency resource location of the CORESET of the corresponding RMSI.

In this embodiment, the time-domain information and the frequency-domain information configured for the CORESET of the RMSI occupy less PBCH resources.

In addition, in this embodiment, there are time intervals between consecutive beams sent by the base station, so that the uplink scheduling can be staggered. For example, as shown in FIG. 4, there is a time interval between the beams 1-2 and 3-4, and the base station can perform uplink scheduling while transmitting a downlink signal.

In the above embodiment, the time-domain information and the frequency-domain information are configured for the CORESET of the RMSI, and the PBCH of the synchronization signal block corresponding to the synchronization signal sent to the UE carries the time-domain information and the frequency-domain information corresponding to the CORESET of the RMSI, thereby providing conditions for the UE to acquire the time-frequency resource location of the CORESET of the corresponding RMSI.

Figure 6:
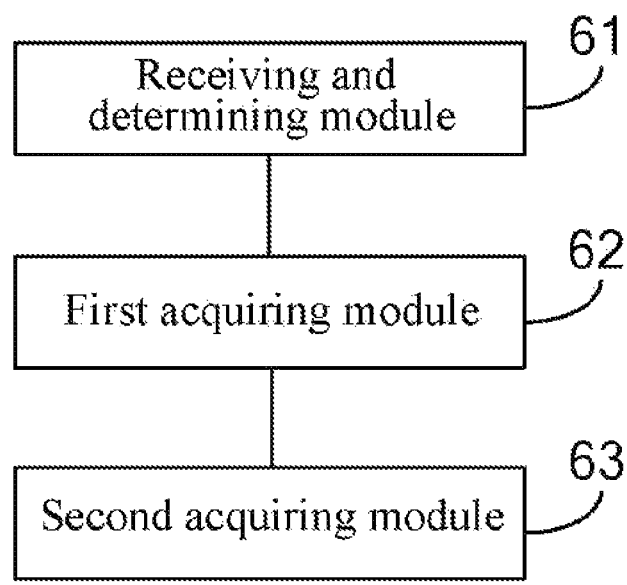
FIG. 6 is a block diagram of a device for acquiring a time-frequency resource location of a CORESET of RMSI according to an exemplary embodiment.

FIG. 6 is a block diagram of a device for acquiring a time-frequency resource location of a CORESET of RMSI according to an exemplary embodiment. This device may be applied to a UE device. As shown in FIG. 6, the device includes a receiving and determining module 61, a first acquiring module 62 and a second acquiring module 63.

The receiving and determining module 61 is configured to receive a synchronization signal sent by a base station, and determine a synchronization signal block corresponding to the synchronization signal.

Since the synchronization signal block includes the synchronization signal, after receiving the synchronization signal sent by the base station, the UE may determine a corresponding synchronization signal block according to the synchronization signal.

The first acquiring module 62 is configured to acquire a physical broadcast channel PBCH of the synchronization signal block determined by the receiving and determining module 61. The PBCH carries time-domain information and frequency-domain information corresponding to the CORESET of the RMSI.

Since the synchronization signal block also includes the PBCH, after determining the synchronization signal block, the UE may acquire the PBCH of the synchronization signal block.

In this embodiment, the time-domain information corresponding to the CORESET of the RMSI may include window information and a time-domain symbol value. There may be multiple time-domain symbol values, however each PBCH can only carry one time-domain symbol value, such as 1, 2, or 3, and so on. In this embodiment, the technical solution is easier to be implemented by specifically illustrating the content of the time-domain information.

The second acquiring module 63 is configured to acquire, according to the time-domain information and the frequency-domain information corresponding to the CORESET of the RMSI carried by the PBCH and acquired by the first acquiring module 62, the time-frequency resource location of the CORESET of a corresponding RMSI.

In the above embodiment, the synchronization signal block corresponding to the received synchronization signal is determined, the PBCH of the synchronization signal block is acquired, and then the time-frequency resource location of the CORESET of the corresponding RMSI is acquired according to the time-domain information and the frequency-domain information corresponding to the CORESET of the RMSI carried by the PBCH, which brings a simple implementation manner.

Figure 7:
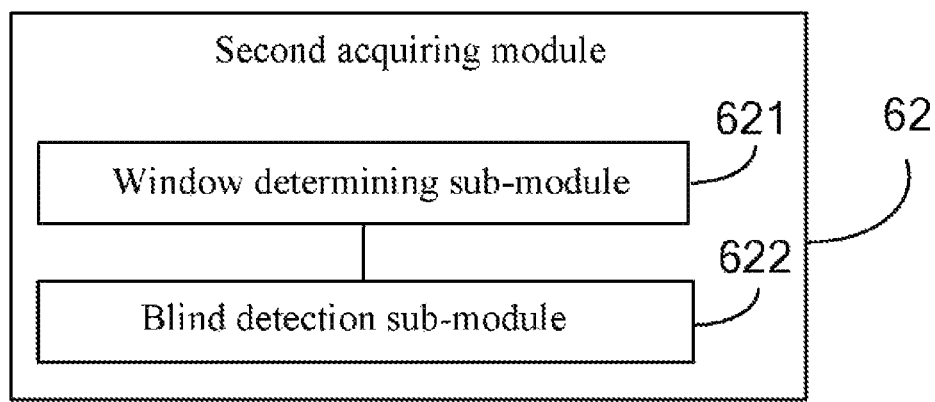
FIG. 7 is a block diagram of another device for acquiring a time-frequency resource location of a CORESET of RMSI according to an exemplary embodiment.

FIG. 7 is a block diagram of another device for acquiring a time-frequency resource location of a CORESET of RMSI according to an exemplary embodiment. As shown in FIG. 7, on the basis of the embodiment shown in FIG. 6, the time-domain information includes window information and a time-domain symbol value, and the second acquiring module 62 may include a window determining sub-module 621 and a blind detection sub-module 622.

The window determining sub-module 621 is configured to determine a window corresponding to the CORESET of the RMSI, according to the window information corresponding to the CORESET of the RMSI.

In this embodiment, the window information corresponding to the CORESET of the RMSI may include a time difference between the RMSI and a corresponding synchronization signal block and a window length. A start time of the window may be determined according to the time difference between the RMSI and the corresponding synchronization signal block, and a final window length may be determined by the UE according to the window length. When a determined final window length is greater than 1, it indicates that the base station may send the time-frequency information of the CORESET through multiple times in the window, which has greater time flexibility and can stagger uplink scheduling. In this embodiment, the content of the window information is illustrated specifically, which makes the technical solution to be implemented more easily.

The blind detection sub-module 622 is configured to perform a blind detection in the window determined by the window determining sub-module according to the time-domain symbol value and the frequency-domain information corresponding to the CORESET of the RMSI, to acquire the time-frequency resource location of the CORESET of the corresponding RMSI.

The frequency-domain information corresponding to the CORESET of the RMSI may include a number of physical resource blocks (PRBs) of the corresponding synchronization signal block of the RMSI. In this embodiment, the content of the frequency-domain information is illustrated specifically, which makes the technical solution to be implemented more easily. In the above embodiment, the time-frequency resource location of the CORESET of the corresponding RMSI is acquired by determining the window corresponding to the CORESET of the RMSI and performing a small number of blind detections in the window, which brings a simple implementation manner and has a small resource-consumption.

Figure 8:
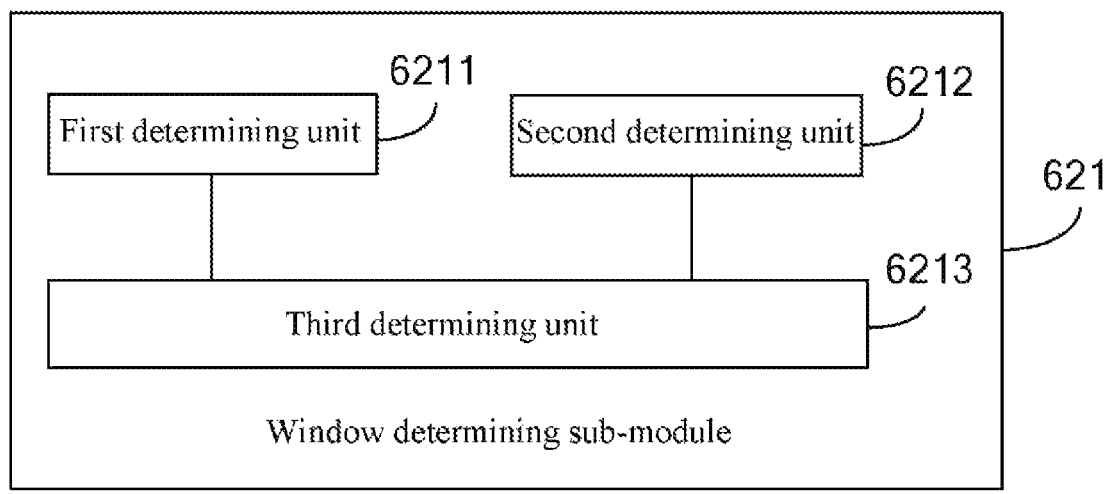
FIG. 8 is a block diagram of another device for acquiring a time-frequency resource location of a CORESET of RMSI according to an exemplary embodiment.

FIG. 8 is a block diagram of another device for acquiring a time-frequency resource location of a CORESET of RMSI according to an exemplary embodiment. As shown in FIG. 8, on the basis of the embodiment shown in FIG. 7, the window determining sub-module 621 includes a first determining unit 6211, a second determining unit 6212 and a third determining unit 6213.

The first determining unit 6211 is configured to determine a start time of the window according to the time difference between the RMSI and the corresponding synchronization signal block and a sending time of the corresponding synchronization signal block.

Assuming that the corresponding synchronization signal block of RMSI1 is synchronization signal block 1, and the time difference between the RMSI 1 and the synchronization signal block 1 is X, and the transmission time of the synchronization signal block 1 is T, the start time of the window is T+X.

The second determining unit 6212 is configured to determine a time interval between the corresponding synchronization signal block of the RMSI and a next synchronization signal block and a minimum value of the window length as a final window length of the window.

In order to more clearly describe the method of determining the final window length, the following description is given in conjunction with a downlink signal shown in FIG. 4. As shown in FIG. 4, there is a time interval between beams 1-2 and 3-4, and there are three time-domain resource units between beams 1 and 3. The time-domain resource unit can be a symbol, or a mini-slot, a time slot, a field, or a radio frame. Since the beam corresponds to the signal synchronization block, three resource units spaced between the beams 1 and 3 indicates that there are three resource unites between the signal synchronization block 1 and the signal synchronization block 3. Assuming that the window length configured by the base station is 5, the minimum value of 3 and 5 is taken, that is, 3, so the final window length determined is 3. The value in each window (that is, 1, 2, 3, or 4) represents the time domain symbol value of the corresponding window.

The third determining unit 6213 is configured to determine the window corresponding to the CORESET of the RMSI, according to the start time of the window determined by the first determining unit 6211 and the final window length of the window determined by the second determining unit 6212.

After the UE determines the start time and the final window length of the window, the window is determined.

In this embodiment, the window is determined by determining the start time of the window according to a time difference between the RMSI and the corresponding synchronization signal block and the sending time of the corresponding synchronization signal block, and determining the time interval between the corresponding synchronization signal block of the RMSI and the next synchronization signal block and the minimum value of the window length as the final window length of the window, which provides a condition for performing the blind detection in the window afterwards.

Figure 9:
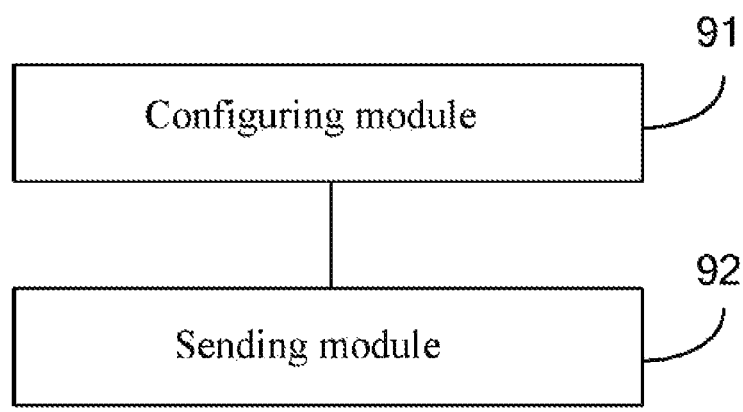
FIG. 9 is a block diagram of a device for indicating a time-frequency resource location of a CORESET of RMSI according to an exemplary embodiment.

FIG. 9 is a block diagram of a device for indicating a time-frequency resource location of a CORESET of RMSI according to an exemplary embodiment. This device may be applied to a base station. As shown in FIG. 9, the device includes a configuring module 91 and a sending module 92.

The configuring module 91 is configured to configure time-domain information and frequency-domain information for the CORESET of the RMSI.

In this embodiment, the time-domain information corresponding to the CORESET of the RMSI may include window information and a time-domain symbol value. There may be multiple time-domain symbol values, however each PBCH can only carry one time-domain symbol value, such as 1, 2, or 3, and so on. In this embodiment, the technical solution is easier to be implemented by specifically illustrating the content of the time-domain information.

In this embodiment, the window information corresponding to the CORESET of the RMSI may include a time difference between the RMSI and a corresponding synchronization signal block and a window length. The frequency-domain information corresponding to the CORESET of the RMSI may include a number of PRBs of the corresponding synchronization signal block of the RMSI. In order to make a final window length determined by the UE greater than 1, the window length configured by the base station is also greater than 1, so as to achieve the purpose of sending the time-frequency information of the CORESET through multiple times in the window, and the time flexibility is stronger. This embodiment makes the technical solution easier to be implemented by specifically explaining the content of the window information and the content of the frequency-domain information.

The sending module 92 is configured to send a synchronization signal to a user equipment UE. A physical broadcast channel PBCH of a synchronization signal block corresponding to the synchronization signal carries the time-domain information and the frequency-domain information corresponding to the CORESET of the RMSI configured by the configuring module 91, for the UE to acquire, according to the time-domain information and the frequency-domain information corresponding to the CORESET of the RMSI, the time-frequency resource location of the CORESET of a corresponding RMSI.

The base station may send the synchronization signal through consecutive beams, and carry the time-domain information and the frequency-domain information configured for the CORESET of the RMSI in the PBCH of the synchronization signal block corresponding to the synchronization signal. In this way, after receiving the time-domain information and the frequency-domain information corresponding to the CORESET OF THE RMSI, the UE may acquire, according to the time-domain information and the frequency-domain information corresponding to the CORESET of the RMSI, the time-frequency resource location of the CORESET of the corresponding RMSI.

In this embodiment, the time-domain information and the frequency-domain information configured for the CORESET of the RMSI occupy less PBCH resources.

In addition, in this embodiment, there are time intervals between consecutive beams sent by the base station, so that the uplink scheduling can be staggered. For example, as shown in FIG. 4, there is a time interval between the beams 1-2 and 3-4, and the base station can perform uplink scheduling while transmitting a downlink signal. In the above embodiment, the time-domain information and the frequency-domain information are configured for the CORESET of the RMSI, and the PBCH of the synchronization signal block corresponding to the synchronization signal sent to the UE carries the time-domain information and the frequency-domain information corresponding to the CORESET of the RMSI, thereby providing conditions for the UE to acquire the time-frequency resource location of the CORESET of the corresponding RMSI.

Figure 10:
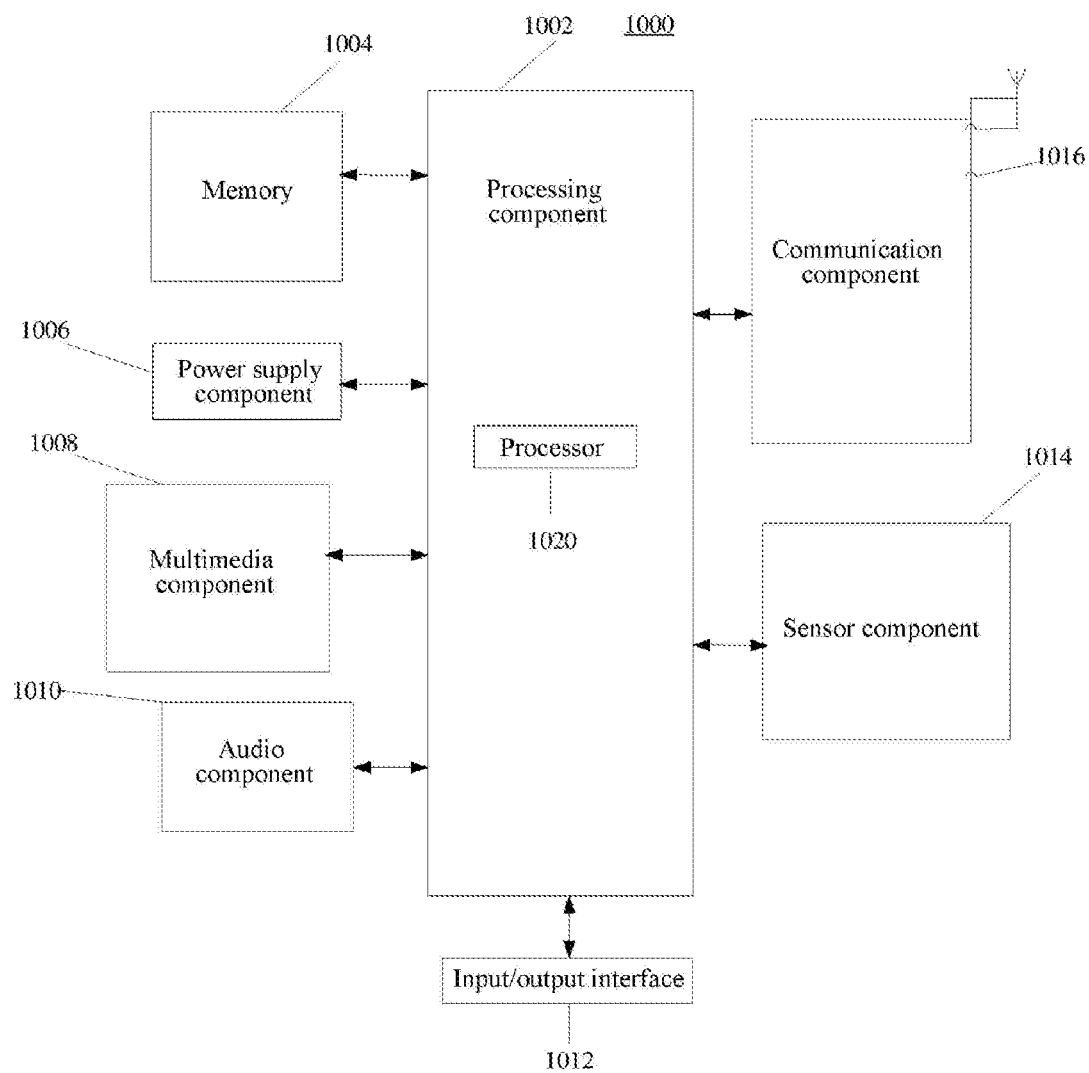
FIG. 10 is a block diagram of a device applied for acquiring a time-frequency resource location of a CORESET of RMSI according to an exemplary embodiment.

FIG. 10 is a block diagram of a device applied for acquiring a time-frequency resource location of a CORESET of RMSI according to an exemplary embodiment. For example, the device 1000 may be a user device such as a mobile phone, a computer, a digital broadcasting terminal, a messaging device, a game console, a tablet device, a medical device, a fitness device, a personal digital assistant, and the like.

Referring to FIG. 10, the device 1000 may include one or more of the following components: a processing component 1002, a memory 1004, a power supply component 1006, a multimedia component 1008, an audio component 1010, an input/output (I/O) interface 1012, a sensor component 1014, and a communication component 1016.

The processing component 1002 generally controls overall operations of the device 1000, such as operations associated with display, telephone calls, data communications, camera operations, and recording operations. The processing component 1002 may include one or more processors 1020 to execute instructions to complete all or part of the steps of the method described above. In addition, the processing component 1002 may include one or more modules to facilitate interaction between the processing component 1002 and other components. For example, the processing component 1002 may include a multimedia module to facilitate the interaction between the multimedia component 1008 and the processing component 1002.

The memory 1004 is configured to store various types of data to support operations at the device 1000. Examples of these data include instructions for any application or method operating on the device 1000, contact data, phone book data, messages, pictures, videos, and the like. The memory 1004 can be implemented by any type of volatile or non-volatile storage device or a combination thereof, such as static random access memory (SRAM), electrically erasable programmable read-only memory (EEPROM), programmable read-only memory (EPROM), programmable read-only memory (PROM), read-only memory (ROM), magnetic memory, flash memory, magnetic disk or optical disk.

The power supply component 1006 provides power to various components of the device 1000. The power supply component 1006 may include a power management system, one or more power sources, and other components associated with generating, managing, and distributing power for the device 1000.

The multimedia component 1008 includes a screen that provides an output interface between the device 1000 and a user. In some embodiments, the screen may include a liquid crystal display (LCD) and a touch panel (TP). If the screen includes the touch panel, the screen may be implemented as a touch screen to receive an input signal from a user. The touch panel includes one or more touch sensors to sense touch, swipe, and gestures on the touch panel. The touch sensor can not only sense the boundary of a touch or slide action, but also detect the duration and pressure associated with a touch or slide operation. In some embodiments, the multimedia component 1008 includes a front camera and/or a rear camera. When the device 1000 is in an operation mode, such as a shooting mode or a video mode, the front camera and/or the rear camera can receive external multimedia data. Each front camera and rear camera can be a fixed optical lens system or have focal length and optical zoom capabilities.

The audio component 1010 is configured to output and/or input audio signals. For example, the audio component 1010 includes a microphone (MIC) configured to receive an external audio signal when the device 1000 is in an operation mode, such as a call mode, a recording mode, and a voice recognition mode. The received audio signal may be further stored in the memory 1004 or transmitted via the communication component 1016. In some embodiments, the audio component 1010 further includes a speaker for outputting audio signals.

The I/O interface 1012 provides an interface between the processing component 1002 and a peripheral interface module. The peripheral interface module may be a keyboard, a click wheel, a button, or the like. These buttons can include, but are not limited to: a home button, a volume button, a start button, and a lock button.

The sensor component 1014 includes one or more sensors for providing status evaluation of various aspects to the device 1000. For example, the sensor component 1014 can detect an on/off state of the device 1000 and the relative positioning of the components, such as the display and keypad of the device 1000. The sensor component 1014 can also detect position change of the device 1000 or a component of the device 1000, contact with the device 1000, orientation or acceleration/deceleration of the device 1000, and temperature change of the device 1000. The sensor assembly 1014 may include a proximity sensor configured to detect presence of nearby objects without any physical contact. The sensor component 1014 may also include a light sensor, such as a CMOS or CCD image sensor, for use in imaging applications. In some embodiments, the sensor assembly 1014 may further include an acceleration sensor, a gyroscope sensor, a magnetic sensor, a pressure sensor, or a temperature sensor.

The communication component 1016 is configured to facilitate wired or wireless communication between the device 1000 and other devices. The device 1000 may access a wireless network based on a communication standard, such as Wi-Fi, 2G, or 3G, or a combination thereof. In one exemplary embodiment, the communication component 1016 receives a broadcast signal or broadcast-related information from an external broadcast management system via a broadcast channel. In one exemplary embodiment, the communication component 1016 further includes a near field communication (NFC) module to facilitate short-range communication. For example, the NFC module can be implemented based on radio frequency identification (RFID) technology, infrared data association (IrDA) technology, ultra wideband (UWB) technology, Bluetooth (BT) technology, and other technologies.

In an exemplary embodiment, the device 1000 may be implemented by one or more application-specific integrated circuits (ASICs), digital signal processors (DSPs), digital signal processing devices (DSPDs), programmable logic devices (PLDs), field programmable gate array (FPGA), controller, microcontroller, microprocessor, or other electronic component to perform the above method.

In an exemplary embodiment, there is further provided a non-transitory computer-readable storage medium including instructions, such as a memory 1004 including instructions. The above instructions can be executed by the processor 1020 of the device to implement the above method for acquiring the time-frequency resource location of the CORESET of the RMSI. For example, the non-transitory computer-readable storage medium may be a ROM, a random-access memory (RAM), a CD-ROM, a magnetic tape, a floppy disk, an optical data storage device, and the like.

Figure 11:
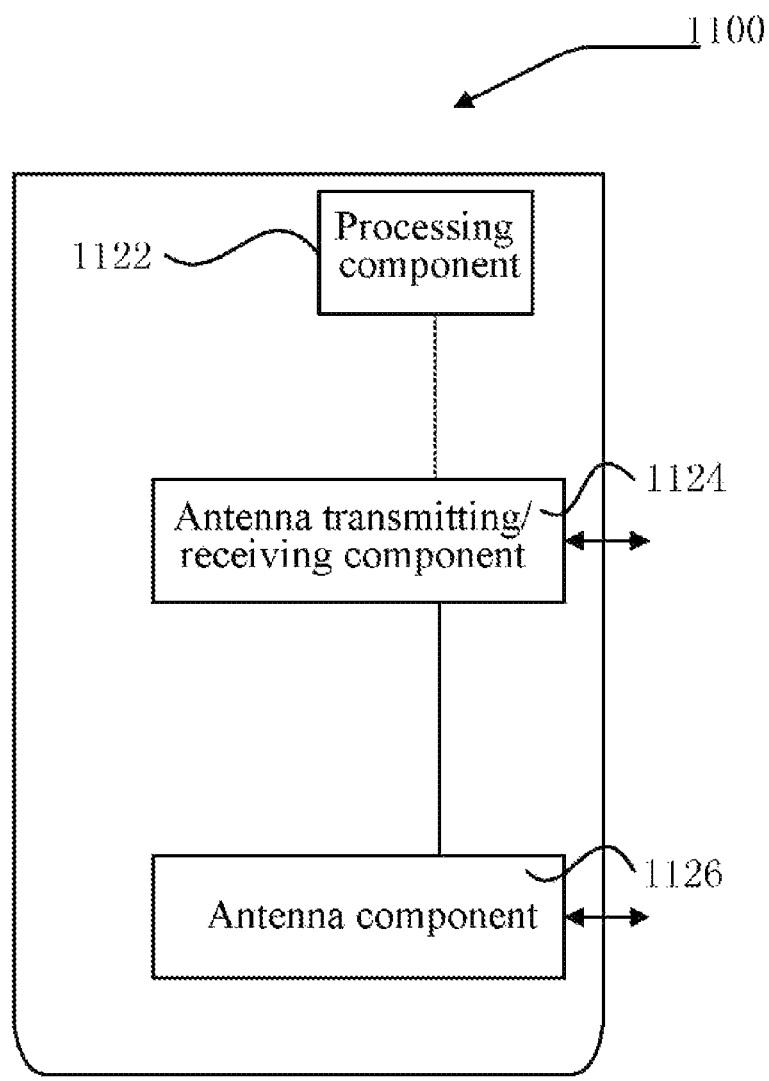
FIG. 11 is a block diagram of a device applied for indicating a time-frequency resource location of a CORESET of RMSI according to an exemplary embodiment.

FIG. 11 is a block diagram of another device applied for indicating a time-frequency resource location of a CORESET of RMSI according to an exemplary embodiment. The device 1100 may be provided as a base station. 11. Referring to FIG. 11, the device 1100 includes a processing component 1122, a wireless transmitting/receiving component 1124, an antenna component 1126, and a signal processing portion unique to a wireless interface. The processing component 1122 may further include one or more processors.

One of the processors in the processing component 1122 may be configured to: configure time-domain information and frequency-domain information for the CORESET of the RMSI; and send a synchronization signal to a user equipment UE. A physical broadcast channel PBCH of a synchronization signal block corresponding to the synchronization signal carries the time-domain information and the frequency-domain information corresponding to the CORESET of the RMSI, for the UE to acquire, according to the time-domain information and the frequency-domain information corresponding to the CORESET of the RMSI, the time-frequency resource location of the CORESET of a corresponding RMSI.

In an exemplary embodiment, there is further provided a non-transitory computer-readable storage medium including instructions, and the instructions may be executed by the processing component 1122 of the device 1100 to implement the above method for indicating a time-frequency resource location of the CORESET of the RMSI. For example, the non-transitory computer-readable storage medium may be a ROM, a random-access memory (RAM), a CD-ROM, a magnetic tape, a floppy disk, an optical data storage device, and the like.

As for the device embodiment, since it basically corresponds to the method embodiment, the relevant parts may refer to the description of the method embodiment. The device embodiments described above are only schematic, and the units described as separate components may be or may not be physically separated, and the components displayed as units may be or may not be physical units, that is, they may be located in one place, or it can be distributed to multiple network units. Some or all of the modules may be selected according to actual needs to achieve the objective of the solution of this embodiment. Those of ordinary skilled in the art can understand and implement without creative efforts.

It should be noted that herein, relational terms such as first and second are used only to distinguish one entity or operation from another entity or operation, and do not necessarily require or imply that there is any such actual relationship or order between these entities or operations. The term "comprising", "including" or any other variation thereof is intended to encompass non-exclusive inclusion, such that a process, method, article, or device that includes a series of elements includes not only those elements but also other elements that are not explicitly listed or elements that are inherent to such process, method, article, or device. Without more restrictions, the elements defined by the sentence "including a . . . " do not exclude the existence of other identical elements in the process, method, article, or device that includes the elements.

Those skilled in the art will readily contemplate other embodiments of the present disclosure after considering the specification and practicing the present disclosure disclosed herein. The present application is intended to cover any variations, uses, or adaptations of the present disclosure that conform to the general principles of the present disclosure and include the common general knowledge or conventional technical means in the technical field not disclosed by the present disclosure. It is intended that the specification and examples be considered as exemplary only, with a true scope and spirit of the present disclosure being indicated by the following claims.

It should be understood that the present disclosure is not limited to the precise structure that has been described above and shown in the drawings, and various modifications and changes may be made without departing from the scope thereof. The scope of the present disclosure is limited only by the following claims.

The invention claimed is:

1. A method for acquiring a time-frequency resource location of a common control resource set CORESET of remaining system information RMSI, which is applied to user equipment (UE), comprising:
   receiving a synchronization signal sent by a base station, and determining a synchronization signal block corresponding to the synchronization signal;
   acquiring a physical broadcast channel PBCH of the synchronization signal block, wherein the PBCH carries time-domain information and frequency-domain information corresponding to the CORESET of the RMSI; and
   acquiring, according to the time-domain information and the frequency-domain information corresponding to the CORESET of the RMSI, the time-frequency resource location of the CORESET of a corresponding RMSI,
   wherein the time-domain information comprises window information and a time-domain symbol value, and the acquiring, according to the time-domain information and the frequency-domain information corresponding to the CORESET of the RMSI, the time-frequency resource location of the CORESET of a corresponding RMSI comprises:
   determining a window corresponding to the CORESET of the RMSI, according to the window information corresponding to the CORESET of the RMSI; and
   performing a blind detection in the window according to the time-domain symbol value and the frequency-domain information corresponding to the CORESET of the RMSI, to acquire the time-frequency resource location of the CORESET of the corresponding RMSI.

2. The method according to claim 1, wherein the window information corresponding to the CORESET of the RMSI comprises a time difference between the RMSI and a corresponding synchronization signal block and a window length, and the frequency-domain information corresponding to the CORESET of the RMSI comprises a number of physical resource blocks PRBs of the corresponding synchronization signal block of the RMSI.

3. The method according to claim 2, wherein the determining a window corresponding to the CORESET of the RMSI, according to the window information corresponding to the CORESET of the RMSI comprises:

determining a start time of the window according to the time difference between the RMSI and the corresponding synchronization signal block and a sending time of the corresponding synchronization signal block;

determining a time interval between the corresponding synchronization signal block of the RMSI and a next synchronization signal block and a minimum value of the window length as a final window length of the window; and determining the window corresponding to the CORESET of the RMSI, according to the start time of the window and the final window length of the window.

4. A method for indicating a time-frequency resource location of a common control resource set CORESET of remaining system information RMSI, which is applied to a base station, comprising:

configuring time-domain information and frequency-domain information for the CORESET of the RMSI; and sending a synchronization signal to user equipment (UE), wherein a physical broadcast channel PBCH of a synchronization signal block corresponding to the synchronization signal carries the time-domain information and the frequency-domain information corresponding to the CORESET of the RMSI, for the UE to acquire, according to the time-domain information and the frequency-domain information corresponding to the CORESET of the RMSI, the time-frequency resource location of the CORESET of a corresponding RMSI, wherein the time-domain information corresponding to the CORESET of the RMSI comprises window information and a time-domain symbol value.

5. The method according to claim 4, wherein the window information comprises a time difference between the RMSI and a corresponding synchronization signal block and a window length, and the frequency-domain information corresponding to the CORESET of the RMSI comprises a number of PRBs of the corresponding synchronization signal block of the RMSI.

6. A non-transitory computer-readable storage medium, with computer programs stored thereon for execution by a processor to implement the method according to claim 1.

7. A non-transitory computer-readable storage medium, with computer programs stored thereon for execution by a processor to implement the method according to claim 4.

8. A device for acquiring a time-frequency resource location of a common control resource set CORESET of remaining system information RMSI, which is applied to user equipment (UE), the device comprising:

a processor, and a memory, having instructions stored thereon, wherein when the instructions are executed by the processor, the processor is caused to:

receive a synchronization signal sent by a base station, and determine a synchronization signal block corresponding to the synchronization signal;

acquire a physical broadcast channel PBCH of the synchronization signal block, wherein the PBCH carries time-domain information and frequency-domain information corresponding to the CORESET of the RMSI; and acquire, according to the time-domain information and the frequency-domain information corresponding to the CORESET of the RMSI, the time-frequency resource location of the CORESET of a corresponding RMSI, wherein the time-domain information comprises window information and a time-domain symbol value, and the acquiring, according to the time-domain information and the frequency-domain information corresponding to the CORESET of the RMSI, the time-frequency resource location of the CORESET of a corresponding RMSI comprises:

determining a window corresponding to the CORESET of the RMSI, according to the window information corresponding to the CORESET of the RMSI; and performing a blind detection in the window according to the time-domain symbol value and the frequency-domain information corresponding to the CORESET of the RMSI, to acquire the time-frequency resource location of the CORESET of the corresponding RMSI.

9. The device according to claim 8, wherein the window information corresponding to the CORESET of the RMSI comprises a time difference between the RMSI and a corresponding synchronization signal block and a window length, and the frequency-domain information corresponding to the CORESET of the RMSI comprises a number of physical resource blocks PRBs of the corresponding synchronization signal block of the RMSI.

10. The device according to claim 9, wherein the determining a window corresponding to the CORESET of the RMSI, according to the window information corresponding to the CORESET of the RMSI comprises:

determining a start time of the window according to the time difference between the RMSI and the corresponding synchronization signal block and a sending time of the corresponding synchronization signal block;

determining a time interval between the corresponding synchronization signal block of the RMSI and a next synchronization signal block and a minimum value of the window length as a final window length of the window; and determining the window corresponding to the CORESET of the RMSI, according to the start time of the window and the final window length of the window.

11. A device implementing the method of claim 4, for indicating a time-frequency resource location of a common control resource set CORESET of remaining system information RMSI, which is applied to a base station, the device comprising:

a processor, and a memory, having instructions stored thereon, wherein when the instructions are executed by the processor, the processor is caused to implement the method.

12. The device according to claim 11, wherein the time-domain information corresponding to the CORESET of the RMSI comprises window information and a time-domain symbol value.

13. The device according to claim 12, wherein the window information comprises a time difference between the RMSI and a corresponding synchronization signal block and a window length, and
the frequency-domain information corresponding to the CORESET of the RMSI comprises a number of PRBs of the corresponding synchronization signal block of the RMSI.

14. A communication system implementing the method according to claim 1, comprising the user equipment (UE) and the base station, wherein a window corresponding to the CORESET of the RMSI is determined, and a small sampling of blind detections are performed in the window to acquire the time-frequency resource location of the CORESET of the corresponding RMSI, thereby reducing resource consumption.

15. The communication system according to claim 14, wherein contents of window information and frequency-domain information are specified, and the window is determined by determining a start time of the window according to a time difference between the RMSI and the corresponding synchronization signal block and a sending time of the corresponding synchronization signal block, and determining a time interval between the corresponding synchronization signal block of the RMSI and a next synchronization signal block and a minimum value of the window length as a final window length of the window, thereby facilitating the blind detections thereafter in the window.

16. The communication system of claim 15, wherein time-domain information and frequency-domain information are configured for a CORESET of RMSI, and a PBCH of a synchronization signal block corresponding to a synchronization signal sent to a UE carries time-domain information and frequency-domain information corresponding to the CORESET of the RMSI, thereby facilitating the UE acquiring a time-frequency resource location of the CORESET of a corresponding RMSI.

* * * * *